United States Patent
Shilling

(10) Patent No.: US 7,905,391 B1
(45) Date of Patent: Mar. 15, 2011

(54) BOOK READING LEVEL SYSTEM

(76) Inventor: Robert F Shilling, Riverhead, NY (US)

( * ) Notice: Subject to any disclaimer, the term of this patent is extended or adjusted under 35 U.S.C. 154(b) by 432 days.

(21) Appl. No.: 12/171,234

(22) Filed: Jul. 10, 2008

(51) Int. Cl.
*G06F 17/00* (2006.01)

(52) U.S. Cl. ......... 235/375; 235/385; 235/435; 235/454; 235/462.01; 235/462.43; 235/462.45; 707/707

(58) Field of Classification Search ................ 235/375, 235/385, 435, 454, 462.01, 462.43, 462.45; 707/707
See application file for complete search history.

(56) References Cited

U.S. PATENT DOCUMENTS

| | | | | |
|---|---|---|---|---|
| 3,680,229 | A * | 8/1972 | Serrie et al. | 434/178 |
| 3,991,299 | A | 11/1976 | Chadima, Jr. et al. | |
| 5,334,822 | A * | 8/1994 | Sanford | 705/28 |
| 6,154,738 | A * | 11/2000 | Call | 1/1 |
| 6,377,986 | B1 * | 4/2002 | Philyaw et al. | 709/219 |
| 6,491,217 | B2 * | 12/2002 | Catan | 235/375 |
| 6,716,032 | B2 * | 4/2004 | Reisz et al. | 434/178 |
| 6,721,625 | B2 | 4/2004 | Mehlberg et al. | |
| 2001/0054067 | A1 * | 12/2001 | Miller et al. | 709/203 |
| 2006/0282413 | A1 * | 12/2006 | Bondi | 707/3 |
| 2007/0150442 | A1 * | 6/2007 | Chin et al. | 707/3 |
| 2007/0292826 | A1 * | 12/2007 | Goddy et al. | 434/156 |
| 2009/0266888 | A1 * | 10/2009 | McCarthy | 235/385 |

* cited by examiner

*Primary Examiner* — Daniel A Hess
*Assistant Examiner* — Michael Andler
(74) *Attorney, Agent, or Firm* — Crossley Patent Law; Mark A. Crossley

(57) ABSTRACT

A book reading level system to match a book on a reading level with a corresponding reader providing a computer with a printer and Internet access, a user website having first and second search engines and a database, a barcode scanner having a display monitor, permanent and replaceable memory chips, and a scanner cradle. The user scans a user barcode from each book and places the scanner into the cradle to access the user website. The first search engine searches for non-user websites to obtain reading levels and download them to the user website. The reading level is downloaded onto the first memory chip from the user website and selectively onto the second memory chip and a label bearing the reading level may be printed. An alternative embodiment allows data access and entry to determine and provide the author's name, genre, title, and study unit related to the book.

16 Claims, 3 Drawing Sheets

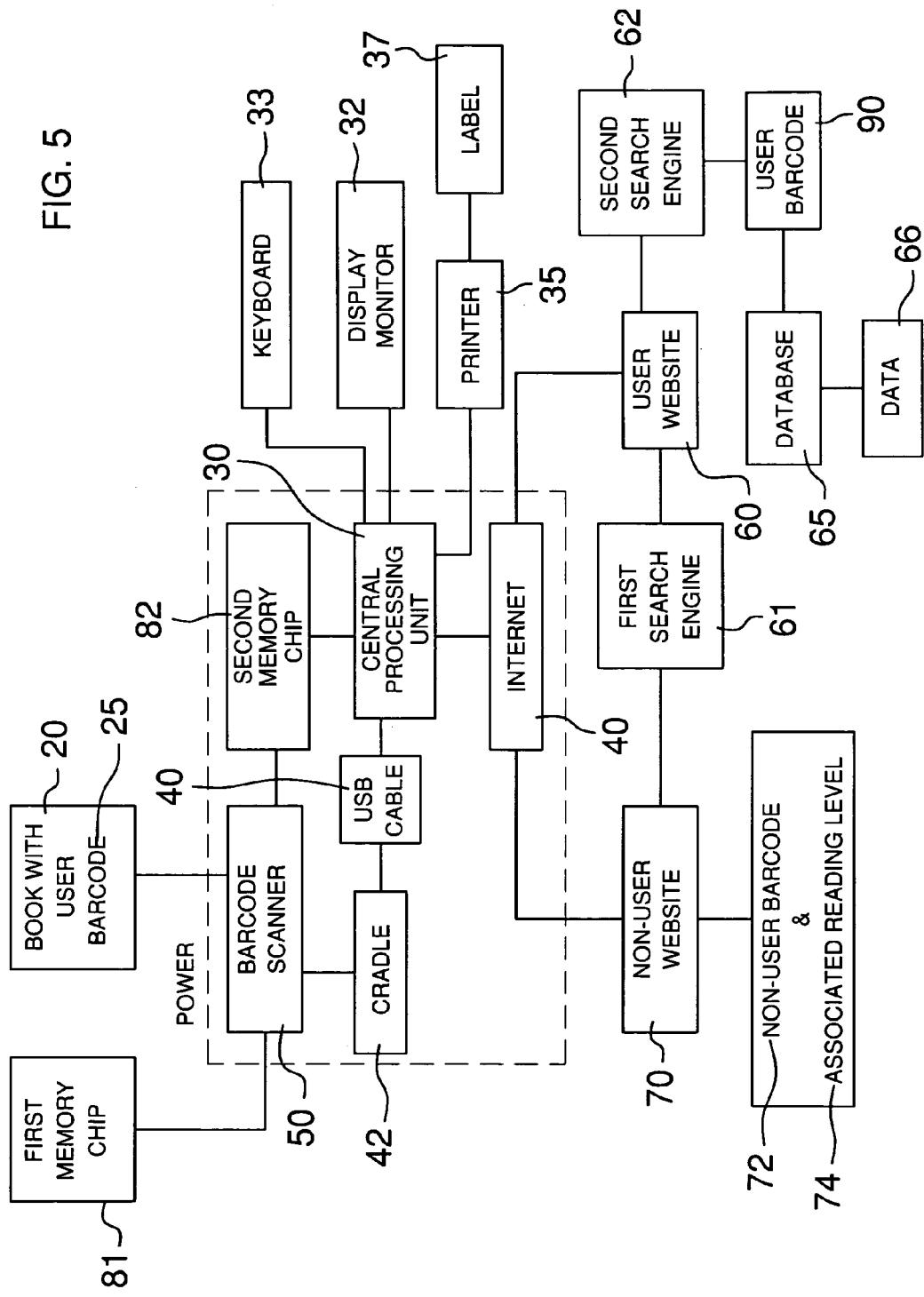

BOOK READING LEVEL SYSTEM

FIELD OF THE INVENTION

The present invention relates to reading level systems and, more specifically, to a book reading level system used to assign a book to a reading level, the system incorporating a scanner to scan book bar codes and to download the bar codes and enter information regarding the books onto a website, which is then used to match a reader to a book on the reader's reading level.

BACKGROUND OF THE INVENTION

Various bar code scanners and methods of tracking inventory using a bar code scanner have been provided. One example is a home inventory system which tracks products by identifiers, a bar code printed on a purchase receipt, and availability to provide notification of a missing item. Another example is a library storage system which employs a barcode dual laser scanner to provide positional data for a tape library system. Still another example is an interactive memory archive which provides an authoring system and procedure for organizing photos which provides notes and associated audio clips. Even another example is an educational toy carrying a barcode scanner for scanning a number of barcodes each associated with a visual message in a book. However, what is needed is a book reading level system which provides a website which may be accessed by educators, parents, libraries, book stores, book clubs, and book publishers to easily and readily locate a book which is on a reader's reading level and which also matches to a reader's study interests or educational needs. Assigning a reading level to a book is a time-consuming and expensive process. Teachers must work over the weekend often and are often paid overtime wages to go through the process of assigning reading levels to books they use in their classrooms. The present book reading level system utilizes a scanner to read existing bar codes on books and to download each barcode onto a website, which is accessed to enter information about a book, including the reading level, genre, subject, title, and other information pertinent to the book, such information being matched to the barcode for the book. A user, including an educator or parent, including those that home-school or wish to buy a book for a child, accesses the website to retrieve information about a book to match the book to a reader based upon the reader's reading level as well as the reader's interests or needs. The information also allows a teacher to create lists of books at various reading levels which tie into the unit of study upon which the teacher is focusing.

SUMMARY OF THE INVENTION

The present book reading level system matches a book assigned a reading level with a corresponding reader having a matching reading ability. The present system provides a computer with a printer and Internet access, a user website having first and second search engines and a database, a barcode scanner having a display monitor, permanent and replaceable memory chips in the scanner, and a scanner cradle. The user scans a user barcode from each book and places the scanner into the cradle to access the user website. The first search engine searches for non-user websites to obtain reading levels and download them to the user website. The reading level is downloaded onto the first memory chip from the user website and selectively onto the second memory chip and, in addition, a label bearing the reading level may be printed. An alternative embodiment allows data access and entry to determine and provide the author's name, genre, title, and study unit related to the book. The size of the scanner is in a range of 6 to 10 inches in height, approximately 6 inches in length, and in a range of 3 to 4 inches wide. The materials used for construction of the various components include metal, plastic, and other materials known in the art.

The present book reading level system assists teachers, school districts, libraries, book suppliers, bookstores, book publishers, and book clubs to assign reading levels to books. Many books may be assigned a reading level in a short period of time compared to manually assigning a reading level or searching the Internet for various websites providing reading levels for books. The system assists in evaluating a student's reading ability, picking an appropriate text for the student, developing units of study based on the reading level, as well as assigning goals for the reader to accomplish. The system also assists in establishing a class library, and helps keep track of checked out books, book inventory, and provides labels for books. The present system also is used by book seller to publicize the levels of books being sold to the public to assist parents in picking out books on the appropriate reading level. In addition, the ability to cross-reference topics and ideas provided in books is provided by the system so that a book may be able to be used in more than one unit of study. The inventor is unaware of any similar product on the market.

As such, the general purpose of the improved book reading level system which has all of the advantages of the prior art mentioned heretofore and many novel features that result in an improved book reading level system which is not anticipated, rendered obvious, suggested, or even implied by the prior art, either alone or in combination thereof.

An object of the present book reading level system is to allow a book to be matched to an individual's reading level.

Another object of the present book reading level system is to make the task of assigning a reading level to a book less time-consuming.

Yet another object of the present book reading level system to make the task of assigning a reading level to a book less expensive.

Still another object of the present system is to allow a user to readily access various Internet websites providing book reading levels via a single website.

Even still another object of the present system is to allow a user to access information regarding a book including the genre, the author, user notes about book, the subject matter and other pertinent information.

Still yet another object of the present book reading level system is to allow a user to print a label to affix to a book with information regarding the book's reading level.

Even yet another object of the present book reading level system is to allow a user to print a label to affix to a book with selected information regarding a book's genre, author, user notes about the book, the subject matter and other pertinent information, in addition to the reading level.

An even still further object of the present system is to provide an inventory of books.

It is still even yet further an object of the present system to provide a replaceable memory stick with information pertaining to a teacher's classroom books.

Thus has been broadly outlined the more important features of the improved book reading level system so that the detailed description thereof that follows may be better understood and in order that the present contribution to the art may be better appreciated.

These together with additional objects, features and advantages of the improved book reading level system will be readily apparent to those of ordinary skill in the art upon reading the following detailed description of presently preferred, but nonetheless illustrative, embodiments of the improved book reading level system when taken in conjunction with the accompanying drawings. In this respect, before explaining the current embodiments of the improved book reading level system in detail, it is to be understood that the invention is not limited in its application to the details of construction and arrangements of the components set forth in the following description or illustration. The invention is capable of other examples and of being practiced and carried out in various ways. It is also to be understood that the phraseology and terminology employed herein are for purposes of description and should not be regarded as limiting.

Those skilled in the art will appreciate that the concept of this disclosure may be readily utilized as a basis for the design of other structures, methods, and kits for carrying out the several purposes of the improved book reading level system. It is therefore important that the claims be regarded as including such equivalent constructions insofar as they do not depart from the spirit and scope of the present invention.

Objects of the improved book reading level system, along with various novel features that characterize the invention are particularly pointed out in the claims forming a part of this disclosure. For better understanding of the improved book reading level system, its operating advantages and specific objects attained by its uses, refer to the accompanying drawings and description.

BRIEF DESCRIPTION OF THE DRAWINGS

FIG. 5 is a block diagram of the system's operation.

DETAILED DESCRIPTION OF THE DRAWINGS

Figure 1:
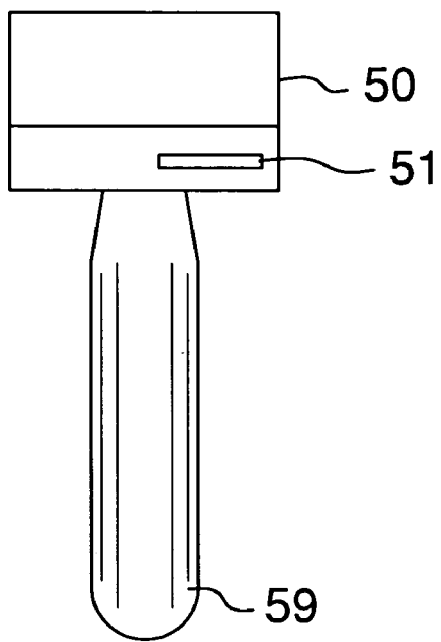
FIG. 1 is a rear elevation view.
Figure 2:
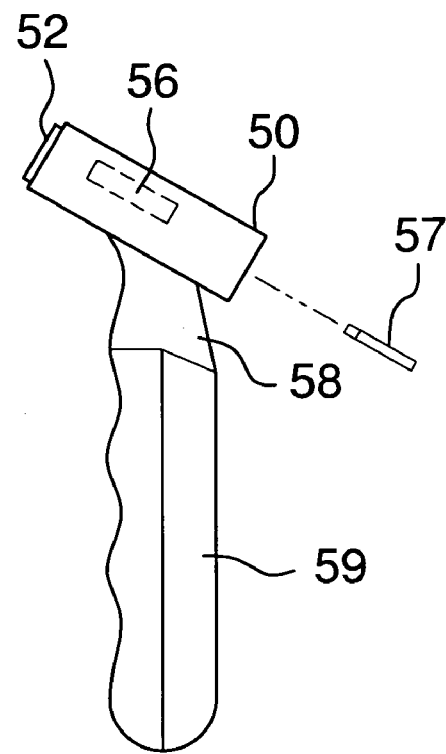
FIG. 2 is a right elevation view.
Figure 3:
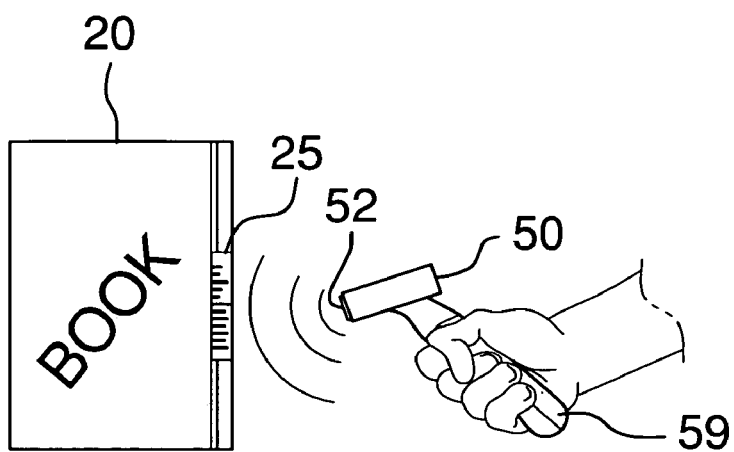
FIG. 3 is a perspective in-use view illustrating manual use of a scanner to scan a book bar code.
Figure 4:
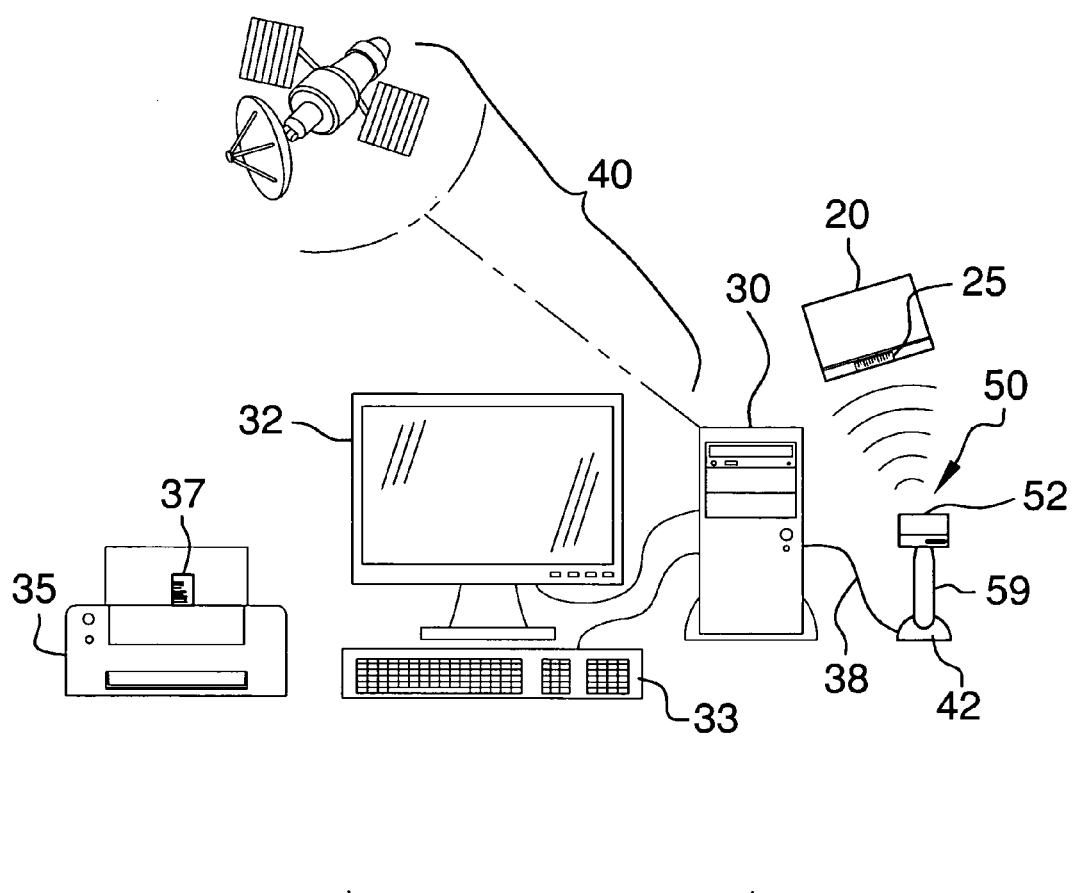
FIG. 4 is a schematic diagram of the system's operation.

With reference now to the drawings, and in particular FIGS. 1 through 5 thereof, examples of the employing the principles and concepts of the present book reading level system, generally designated by the reference number 10, will be described.

Referring to FIGS. 1 through 5, the present book reading level system 10 provides at least one book 20 bearing a user barcode 25. The system 10 also provides a central processing unit 30 having a display monitor 32, a keyboard 33, and a printer 35 operationally engaged thereto and Internet access 40 therethrough, wherein the printer 35 prints at least one label 37. A user website 60 on the Internet is also provided. The user website 60 has a first search engine 61, a second search engine 62, and a user database 65. At least one non-user Internet website 70 is provided which contains at least one non-user book barcode 72 associated to a book reading level 74. The present system also provides a barcode scanner 50. The barcode scanner 50 is operationally engaged to a scan path 52; a permanent first memory chip 56; and a replaceable second memory chip 57. The second memory chip 57 is inserted into and removed from the scanner 50 via a receptacle 51. The barcode scanner 50 is affixed to a moveable object 58 having a handle 59 for ease of use in manual scanning tasks. The barcode scanner 50 reads and converts a user barcode via the scan path 52 into alpha-numeric characters. A cradle 42 is operationally engaged to the central processing unit 30 via a USB cable 38 and is removably operationally engaged to the scanner 50. The engagement of the scanner 50 to the cradle 42 operationally engages the cradle 42 to the first memory chip 81 and second memory chip 82 and accesses the user website 60 on the Internet 40. Accessing the user website 60 permits a user to selectively activate the first search engine 61 and the second search engine 62 and to selectively access the database 65. Activation of the first search engine 61 initiates a search of each non-user Internet website 70 thereby locating each non-user Internet website 70. Each location of a non-user Internet website 70 instigates a download of each non-user barcode 72 and each book reading level 74 associated with each non-user barcode 72 to the user website 60. The activation of the second search engine 62 initiates a search of the user website 60 for and locating a non-user barcode 72 matching a user barcode 90. The location of a non-user barcode 72 matching each user barcode 90 on the user website 60 initiates the download of the user barcode 90 and associated reading level 74 of the matching non-user barcode 72 onto the first memory chip 81. Further, the location of a non-user barcode 72 matching each user barcode 90 on the user website 60 selectively displays the user barcode 90 and the reading level 74 associated with the matching non-user barcode 72 on the display monitor 32. In addition, the location of a non-user barcode 72 matching each user barcode 90 on the user website 60 selectively causes the printer 35 to print a label 37 bearing the user barcode 90 and the reading level 74 associated with the matching non-user barcode 72. Still further, the location of a non-user barcode 72 matching each user barcode 90 on the user website 60 selectively initiates a download of each user barcode 90 and the reading level 74 associated with the matching non-user barcode 72 onto the second memory chip 82. A user may also selectively access and input data 66 into the database 65. The user barcode 25 and the non-user barcode 72 may comprise an ISBN barcode or other barcodes which may be affixed to a book. The labels 37 of the present book reading level system 10 may also be color-coded. A user may access or input data 66 including the book title, genre of the book, author of the book, user notes regarding the book, and study unit to which the book is related.

Operation:

To assign a book having a reading level to a reader on the book's reading level, a user starts by possessing a book 20 bearing a user barcode 25. The user accesses the central processing unit 30. The printer 35 prints at least one label 37. Accessing the user website 60 on the Internet 40. The user scans a user barcode 90 via the barcode scanner 50, using the handle 59 to hold the moveable object 58 to which the scanner 50 is affixed to position the scanner 50 into position to scan the user barcode 90, whereby the barcode scanner 50 reads and converts a user barcode 25 into alpha-numeric characters. After scanning all of the book user barcodes 90 that the user desires, the user places the scanner 50 into the cradle 42 to operationally engage the cradle 42 to the central processing unit 30 via the USB cable 38 and to removably operationally engage the cradle 42 to the scanner 50. Engaging the scanner 50 to the cradle 42 operationally engages the cradle 42 to the first memory chip 81 and the second memory chip 82 and accesses the user website 60. A user may then selectively activate the first search engine 61 to thereby initiate a search of each non-user Internet website 70 and to locate each non-user Internet website 70. Upon location of a non-user barcode 72 matching each user barcode 90 on the non-user Internet website 70, each non-user barcode 72 and each book reading level 74 associated therewith is downloaded onto the user website 60. The user may also selectively activate the second search engine 62 to initiate a search of the user website 60 to find and locate a non-user bar code 72 matching the user barcode 90. Upon location of a non-user barcode 72 matching each user barcode 90 on the user website 60, each user barcode 90 and a reading level 74 associated with the matching non-user barcode 72 is downloaded onto the first memory chip 61 and the user barcode 90 and the reading level 74 associated with the matching non-user barcode 72 may be selectively displayed on the display monitor 32. Also, upon location of a non-user barcode 72 matching each user barcode 90 on the user website 60, a user may selectively cause the printer 35 to print a label 37, which may be color-coded, bearing the user barcode 90 and the associated reading level 74 of a matching non-user barcode 72 and, further, may selectively initiate a download onto the second memory chip 62 each user barcode 90 and the reading level 74 associated with a matching non-user barcode 72. The system 10 also permits a user to selectively access and input data 66 into the database 65. The data 66 which may be accessed and entered includes the book title, the genre of the book, author of the book, user notes regarding the book, and the study unit to which the book is related.

With respect to the above description then, it is to be realized that the optimum dimensional relationships for the parts of the book reading level system, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Directional terms such as "front", "back", "in", "out", "downward", "upper", "lower", and the like may have been used in the description. These terms are applicable to the examples shown and described in conjunction with the drawings. These terms are merely used for the purpose of description in connection with the drawings and do not necessarily apply to the position in which the present invention may be used.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A book reading level system comprising, in combination:
    at least one book bearing a user barcode;
    a central processing unit having a display monitor, a keyboard, and a printer operationally engaged thereto and Internet access therethrough, wherein the printer prints at least one label;
    a user website on the Internet, the user website comprising a first search engine and a second search engine;
    at least one non-user Internet website comprising at least one non-user book barcode associated to a book reading level;
    a barcode scanner comprising:
        a scan path operationally engaged to the scanner;
        a permanent first memory chip operationally engaged to the scanner;
        a replaceable second memory chip operationally engaged to the scanner;
        wherein the scanner is affixed to a moveable object having a handle;
        whereby the barcode scanner reads and converts a user barcode into alpha-numeric characters;
    a cradle operationally engaged to the central processing unit via a USB cable and removably operationally engaged to the scanner,
    whereby engagement of the scanner to the cradle operationally engages the cradle to the first memory chip and second memory chip and accesses the user website;
    whereby access to the user website permits a user to selectively activate the first search engine and the second search engine;
    whereby activation of the first search engine initiates a search of each non-user Internet website thereby locating each non-user Internet website;
    whereby each location of a non-user Internet website instigates a download of each non-user barcode and each book reading level associated to each non-user barcode to the user website;
    whereby activation of the second search engine initiates a search of the user website for and locates a non-user barcode matching a user barcode;
    whereby location of a non-user barcode matching each user barcode on the user website initiates the download of the user barcode and associated reading level onto the first memory chip;
    whereby location of a non-user barcode matching each user barcode on the user website selectively displays the user barcode and the reading level associated with the user barcode on the display monitor;
    whereby location of a non-user barcode matching each user barcode on the user website selectively causes the printer to print a label bearing the user barcode and the associated reading level; and
    whereby location of a non-user barcode matching each user barcode on the user website selectively initiates a download of each user barcode and the associated reading level onto the second memory chip.

2. The book reading level system of claim 1 wherein the user barcode and the non-user barcode comprise an ISBN barcode.

3. The book reading level system of claim 2 wherein the labels are color-coded.

4. The book reading level system of claim 1 wherein the labels are color-coded.

5. A book reading level system comprising, in combination:
    at least one book bearing a user barcode;
    a central processing unit having a display monitor, a keyboard, and a printer operationally engaged thereto and Internet access therethrough, wherein the printer prints at least one label;
    a user website on the Internet, the user website comprising a first search engine, a second search engine, and a user database;
    at least one non-user Internet website comprising at least one non-user book barcode associated to a book reading level;
    a barcode scanner comprising:
        a scan path operationally engaged to the scanner;
        a permanent first memory chip operationally engaged to the scanner;
        a replaceable second memory chip operationally engaged to the scanner;
        wherein the scanner is affixed to a moveable object having a handle;
        whereby the barcode scanner reads and converts a user barcode into alpha-numeric characters;

a cradle operationally engaged to the central processing unit via a USB cable and removably operationally engaged to the scanner, whereby engagement of the scanner to the cradle operationally engages the cradle to the first memory chip and second memory chip and accesses the user website;

whereby access to the user website permits a user to selectively activate the first search engine and the second search engine and to selectively access the database;

whereby activation of the first search engine initiates a search of each non-user Internet website thereby locating each non-user Internet website;

whereby each location of a non-user Internet website instigates a download of each non-user barcode and each book reading level associated to each non-user barcode to the user website;

whereby activation of the second search engine initiates a search of the user website for and locating a non-user barcode matching a user barcode;

whereby location of a non-user barcode matching each user barcode on the user website initiates the download of the user barcode and associated reading level of the matching non-user barcode onto the first memory chip;

whereby location of a non-user barcode matching each user barcode on the user website selectively displays the user barcode and the reading level associated with the matching non-user barcode on the display monitor;

whereby location of a non-user barcode matching each user barcode on the user website selectively causes the printer to print a label bearing the user barcode and the reading level associated with the matching non-user barcode;

whereby location of a non-user barcode matching each user barcode on the user website selectively initiates a download of each user barcode and the reading level associated with the matching non-user barcode onto the second memory chip; and whereby a user selectively accesses and inputs data into the database.

6. The book reading level system of claim 5 wherein the user barcode and the non-user barcode comprise an ISBN barcode.

7. The book reading level system of claim 6 wherein the data is selected from the group consisting of the book title, genre of the book, author of the book, user notes regarding the book, and study unit to which the book is related.

8. The book reading level system of claim 6 wherein the labels are color-coded.

9. The book reading level system of claim 8 wherein the data is selected from the group consisting of the book title, genre of the book, author of the book, user notes regarding the book, and study unit to which the book is related.

10. The book reading level system of claim 5 wherein the labels are color-coded.

11. The book reading level system of claim 10 wherein the data is selected from the group consisting of the book title, genre of the book, author of the book, user notes regarding the book, and study unit to which the book is related.

12. The book reading level system of claim 5 wherein the data is selected from the group consisting of the book title, genre of the book, author of the book, user notes regarding the book, and study unit to which the book is related.

13. A method for assigning a book having a reading level to a reader on the book's reading level, the method comprising:

possessing a book bearing a user barcode;

accessing a central processing unit having a display monitor, a keyboard, and a printer operationally engaged thereto and Internet access therethrough, wherein the printer prints at least one label;

accessing a user website on the Internet, the user website comprising a first search engine, a second search engine, and a user database;

accessing at least one non-user Internet website comprising at least one non-user book barcode associated to a book reading level;

scanning a user barcode via a scanner, the scanner comprising:

a scan path operationally engaged to the scanner;

a permanent first memory chip operationally engaged to the scanner;

a replaceable second memory chip operationally engaged to the scanner;

wherein the scanner is affixed to a moveable object having a handle;

whereby the barcode scanner reads and converts a user barcode into alpha-numeric characters;

operationally engaging a cradle to a computer via a USB cable;

removably, operationally engaging a cradle to a scanner;

engaging the scanner to the cradle whereby the cradle operationally engages the first memory chip and the second memory chip and accesses the user website;

selectively activating the first search engine, thereby initiating a search of and locating each non-user Internet website;

downloading each non-user barcode and each book reading level associated with each non-user barcode onto the user website upon location of a non-user barcode matching each user barcode on the non-user Internet website;

selectively activating the second search engine thereby initiating a search of the user website for and locating a non-user barcode matching a user barcode;

downloading each user barcode and a reading level associated with the matching non-user barcode onto the first memory chip upon location of a non-user barcode matching each user barcode on the user website;

selectively displaying a user barcode and the reading level associated with the matching non-user barcode on the display monitor upon location of a non-user barcode matching each user barcode on the user website;

selectively causing a printer to print a label bearing the user barcode and the associated reading level of a matching non-user barcode upon location of a non-user barcode matching each user barcode on the user website;

selectively initiating a download onto the second memory chip of each user barcode and the reading level associated with a matching non-user barcode on the user website upon location of a non-user barcode matching each user barcode on the user website; and selectively accessing and inputting data into the database.

14. The method for assigning a book having a reading level to a reader on the book's reading level of claim 13 further comprising scanning a user barcode comprising an ISBN barcode.

15. The method for assigning a book having a reading level to a reader on the book's reading level of claim 14 further comprising printing on at least one color-coded label.

16. The method of claim 15 further comprising inputting data into the database, the data selected form the group consisting of the book title, genre of the book, author of the book, user notes regarding the book, and study unit to which the book is related.

* * * * *